US007978369B2

(12) United States Patent
Haikin

(10) Patent No.: US 7,978,369 B2
(45) Date of Patent: Jul. 12, 2011

(54) PLUG-IN FOR CUSTOMIZED DEVICE MODEL WITH INTERFACE FOR DEVICE PROFILER AND FOR COLOR MANAGEMENT SYSTEM

(75) Inventor: John Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 12/123,431

(22) Filed: May 19, 2008

(65) Prior Publication Data

US 2009/0284764 A1 Nov. 19, 2009

(51) Int. Cl.
*H04N 1/60* (2006.01)
(52) U.S. Cl. ......... 358/1.9; 358/518; 358/520; 358/523; 358/524; 345/600; 345/601
(58) Field of Classification Search .................. 358/1.9, 358/518, 520, 523, 524; 345/590, 597, 600, 345/601
See application file for complete search history.

(56) References Cited

U.S. PATENT DOCUMENTS

| | | | | |
|---|---|---|---|---|
| 6,088,038 | A * | 7/2000 | Edge et al. ..................... | 345/600 |
| 6,362,808 | B1 * | 3/2002 | Edge et al. ..................... | 345/601 |
| 6,400,843 | B1 | 6/2002 | Shu et al. ...................... | 382/167 |
| 6,720,973 | B2 | 4/2004 | Butler .......................... | 345/604 |
| 6,922,266 | B2 | 7/2005 | Hiramatsu .................... | 358/518 |
| RE39,161 | E * | 7/2006 | Edge et al. ..................... | 345/600 |
| 7,382,379 | B1 * | 6/2008 | Edge et al. ..................... | 345/600 |
| 7,706,020 | B2 * | 4/2010 | Presley et al. ................. | 358/1.9 |
| 7,793,306 | B2 * | 9/2010 | Vasudevan et al. ........... | 719/320 |
| 7,796,296 | B2 * | 9/2010 | Martinez et al. .............. | 358/1.9 |
| 2005/0249403 | A1 | 11/2005 | Haikin .......................... | 382/162 |
| 2007/0035751 | A1 * | 2/2007 | Presley et al. ................. | 358/1.9 |
| 2007/0046958 | A1 * | 3/2007 | Hoof et al. .................... | 358/1.9 |
| 2007/0052985 | A1 * | 3/2007 | Presley et al. ................. | 358/1.9 |
| 2007/0080974 | A1 * | 4/2007 | Edge et al. ..................... | 345/589 |
| 2007/0081176 | A1 | 4/2007 | Newman et al. ............... | 358/1.9 |
| 2007/0083874 | A1 * | 4/2007 | Vasudevan et al. ........... | 719/328 |
| 2007/0109565 | A1 * | 5/2007 | Presley et al. ................. | 358/1.9 |
| 2007/0195345 | A1 * | 8/2007 | Martinez et al. .............. | 358/1.9 |
| 2008/0117226 | A1 * | 5/2008 | Edge et al. ..................... | 345/600 |
| 2008/0117227 | A1 * | 5/2008 | Edge et al. ..................... | 345/600 |
| 2008/0136836 | A1 * | 6/2008 | Edge et al. ..................... | 345/600 |
| 2008/0150960 | A1 * | 6/2008 | Edge et al. ..................... | 345/600 |
| 2008/0218779 | A1 * | 9/2008 | Shirasawa ..................... | 358/1.9 |
| 2008/0235624 | A1 * | 9/2008 | Murata ......................... | 715/825 |

(Continued)

OTHER PUBLICATIONS

"Windows Color System", Version 1.0, Microsoft Developer Network Library for Visual Studio 2008.

(Continued)

*Primary Examiner* — Kimberly A Williams
(74) *Attorney, Agent, or Firm* — Fitzpatrick, Cella, Harper & Scinto

(57) ABSTRACT

A measurement-based color management system (MBCMS) plugin device model, methods, and a color profiler program that use the plugin device model. The plugin device model provides both an interface used to convert between device dependent and device independent color values, and an interface used to create a color device profile for use with the plugin device model. The color profiler receives color sample information from the plugin device model, using the color profiler interface provided by the plugin device model. The color profiler generates a color target having color samples as specified by the received color sample information. The color values of the color target's color samples are measured. The color device profile is generated, based on the measured color values.

18 Claims, 5 Drawing Sheets

U.S. PATENT DOCUMENTS

2009/0184975 A1* 7/2009 Yao et al. .................. 345/590
2010/0149203 A1* 6/2010 Mebane .................... 345/589

OTHER PUBLICATIONS

Bourgoin, "Windows Color System: Evolution in the Microsoft Color Management Ecosystem", 2005 Microsoft Corp.

Vasudevan, et al., "Windows Color System Overview", Microsoft Corp.

"Windows Color System: The Next Generation Color Management System", Microsoft Corp., Published: Sep. 2005.

"Color Management with Mac OS X Tiger" Technology Tour Dec. 2005.

* cited by examiner

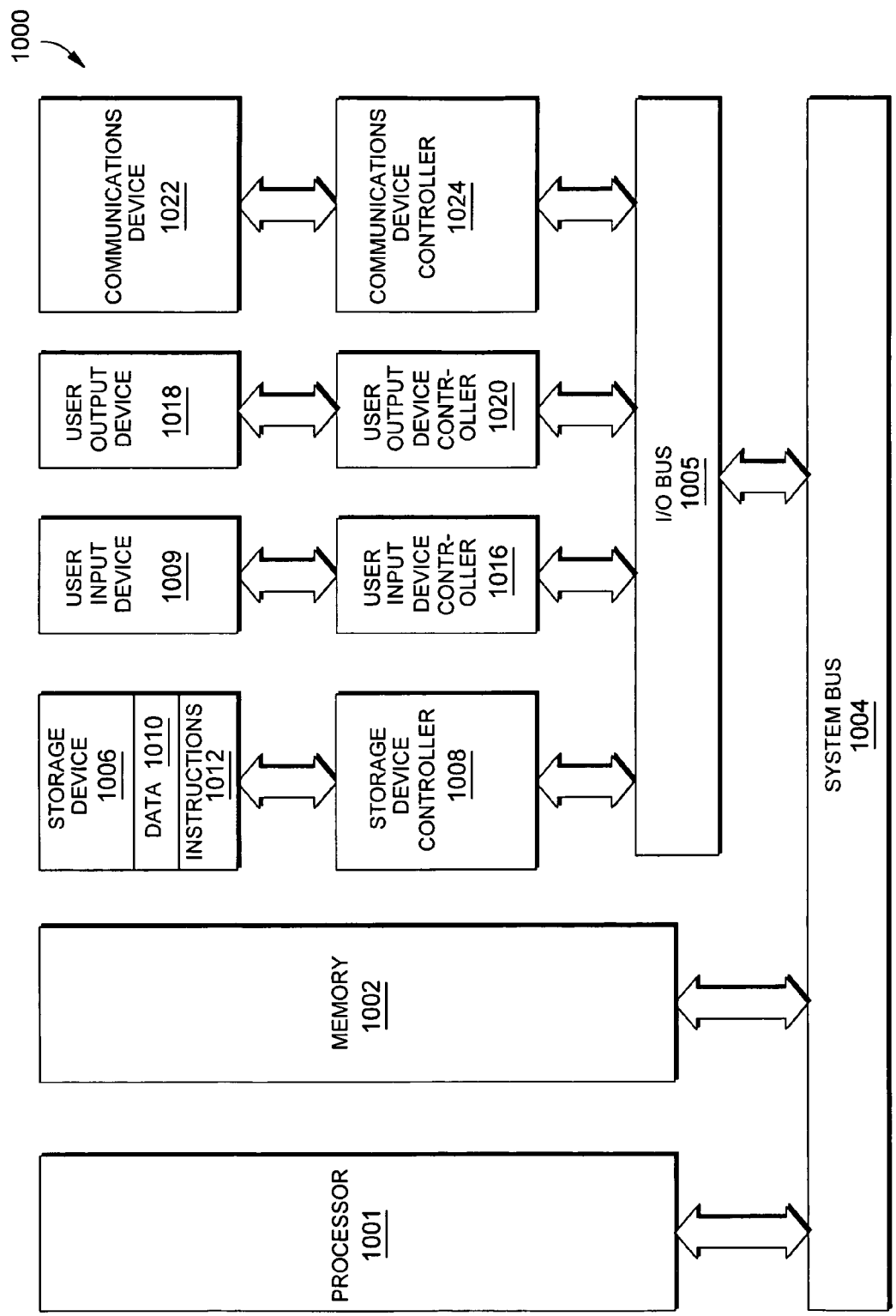

PLUG-IN FOR CUSTOMIZED DEVICE MODEL WITH INTERFACE FOR DEVICE PROFILER AND FOR COLOR MANAGEMENT SYSTEM

BACKGROUND OF THE INVENTION

1. Field of the Invention

The invention relates to color management systems, and more particularly relates to generating customized device profiles for use with a plugin device model in a measurement-based color management system.

2. Description of the Related Art

One central concept in color management is the need for accurate device characterization, i.e., characterization of a color input or output device in terms of its color behavior. For use by color management systems, the device's color characteristics are encapsulated together with other information in a "device profile". Currently known types of device profiles include older-style transform-based device profiles and newer-style measurement-based profiles.

An example of a transform-based device profile is typified by International Color Consortium (ICC) color management systems (CMS) which utilize transform-based color profiles for the conversion of color image data between device-dependent and device-independent color spaces. Such color profiles are often created by a hardware manufacturer of a target color device. These color profiles are typically created by a color profiler device. The color profiler device might be a general-purpose computer interfaced to the target color device as well as color measurement devices (e.g., a calorimeter), and executing a color profiler program.

In the case of an output device (e.g., a printer or display), the color profiling device creates color profiles by displaying or printing a sample set of controlled device signals (i.e., a "target"), and measuring the calorimetric values of the displayed or printed output. The sample set of device signals, and measured calorimetric values, are used to generate a color profile for the device.

In the case of capture devices (e.g., scanners and digital cameras), an image of a known color target is captured. Suitable targets include a Gretag-Macbeth color checker chart. Device signals that the capture device reports for a given color patch from the color target and the measured calorimetric value for that color patch are used to generate a color profile for the device.

More recently, measurement-based color management systems (MBCMS) have been developed that use measurement-based profiles. Unlike transform-based profiles which contain transforms for converting between device colors and calorimetric values (i.e., device independent values), measurement-based profiles contain measured color values. Measurement-based CMSs use device models to convert between device colors and calorimetric values using measurement-based profiles. Device models are software modules that receive information contained in measurement-based profiles, and provide color conversion via a standardized programming interface.

These MBCMSs often have a workflow such as that depicted in FIG. 1. As seen there, device models use information contained within device profiles to convert colors from a source device's color space to a destination device's color space. Source device model 10 uses source device profile 50 to convert source device colors (colorants) 1 to source device calorimetric values 12 in a device independent color space (e.g., the CIEXYZ color space). Source device calorimetric values 12 are then converted to appearance values 22 (e.g., in the CIECAM02 JCh color appearance space) by color appearance model 20, which uses an appearance model profile for source device viewing conditions (i.e., 60) to perform the conversion.

In order to properly model the behavior of a device, the device model (e.g., 10) is initialized with measurement information obtained from the device model profile (e.g., 50). The format of the information in the profile is specific to the implementation and can take the form of binary formatted data, such as in an ICC profile, text formatted data, or XML formatted data. The information used by the device model during the initialization process can be processed directly by the device model itself or the information can be obtained from the profile by a separate routine and provided to the device model in a standardized manner. For example, if the measurement profile is stored in an XML format using a schema, the information can be obtained by the device model using the XML DOM (data object model) process. Because the specific information required by the device model will vary from device type to device type, the actual measurement file contents will vary as well.

Gamut mapping model 40 then uses a gamut boundary description for the source device (i.e., 30) and a gamut boundary description for the destination device (i.e., 31) to convert source device color appearance values 22 to destination device color appearance values 23.

Next, destination device color appearance values 23 are converted to destination device calorimetric values 13 by color appearance model 21, which uses an appearance model profile for destination device viewing conditions (i.e., 61) to perform an inverse conversion. Finally, destination device model 11 uses destination device profile 51 to convert destination device calorimetric values 13 to destination device colors (colorants) 2.

The device models (e.g., 10 and 11) work hand-in-hand with the device profiles (e.g., 50 and 51), in the sense that the device models expect to be able to find specific information, required by the device model, inside the device profile.

Typical MBCMSs support both baseline device models and plugin device models. The baseline device models are typically provided as a default by the MBCMS, and each models the general behavior common to a particular class of devices. Examples of baseline models include CRT, LCD, ICC virtual device, RGB virtual device, RGB capture device, RGB projector, RGB printer, and CMYK printer device models. A general purpose profiler may be used to generate measurement-based profiles for devices modeled by the baseline device models.

A plugin device model, as opposed to a baseline model, departs from a baseline model and is tailored to specific behavior of the modeled device. Often, the plugin model is created by the device vendor, to take advantage of the behavior of the device that is understood by the vendor. When used with a customized measurement-based device profile that provides additional information about the device (beyond information typically included in a profile and expected by a baseline device model), the plugin device model provides the MBCMS with a more accurate model of the device's behavior.

SUMMARY OF THE INVENTION

Plugin device models are typically proprietary, and it is difficult for device vendors to specify requirements for custom device profiles without revealing internal proprietary details about the device's behavior. However, without these requirements, it is difficult for color profile vendors (other than the device vendor) to produce measurement-based device profiles that provide the information expected by the plugin device model.

The embodiments of the present invention address the foregoing by providing a measurement-based color management system (MBCMS) plugin device model that provides both an interface used by the MBCMS to convert between device dependent and device independent color values, and an interface used by a device profiler to create a color device profile for use with the plugin device model. Methods and a color profiler program that use the plugin device model are also provided.

Thus, in one example embodiment, a measurement-based color device profile is generated for use with a plugin device model in a measurement-based color management system (MBCMS). A color profiler receives color sample information from the plugin device model, using a programming interface provided by the plugin device model. The color profiler generates a color target having color samples as specified by the received color sample information. The color values of the color target's color samples are measured. The color device profile is generated, based on the measured color values.

By virtue of the foregoing, color profile vendors may more easily produce customized measurement-based device profiles for use with plugin device models, and requirements for custom device profiles may be communicated without revealing internal proprietary details about the device's behavior.

The color sample information can specify a number of color samples to be included in the generated color target, and corresponding device color values for each color sample.

The device can be a printer, and the color target can be a printed target generated by printing the specified device color values using the printer. The specified device color values can be used to generate the color device profile.

The device can be a display, and the color target can be a displayed target generated by displaying the specified device color values on the display. The specified device color values can be used to generate the color device profile.

The device can be a digital input device, and the color target can be a printed target generated by using a printer to print the specified device color values. The digital input device can be used to capture an image of the color target, and device color values of the captured image can be used to generate the color device profile. The digital input device can include at least one of a digital camera and a scanner.

The color profiler can receive color profile format information from the plugin device model, using the programming interface provided by the plugin device model, and the color device profile can be generated according to the received color profile format information. The color profile format information can include an XML schema.

The generated color device profile can be stored on a computer-readable storage medium. The measurements included in the generated measurement-based color device profile can be sent to the plugin device model using the programming interface provided by the plugin device model. The color management system can be a Microsoft Windows Color System®.

In another example embodiment, a plugin device model for use within a measurement-based color management system (MBCMS) includes a MBCMS interface and a color profiler interface. The MBCMS interface is used by the MBCMS for color conversion processing, wherein the MBCMS uses the MBCMS interface to convert between device dependent color values and device independent color values. The color profiler interface is used by a color profiler for generation of a color device profile to be accessed by the plugin device model. The color profiler uses the color profiler interface to generate a color device profile containing information expected by the plugin device model for color conversion processing in the MBCMS.

The color profiler can use the color profiler interface to send the information contained in the generated profile to the plugin device model while the plugin device model is interacting with the MBCMS via the MBCMS interface. In this manner, on-the-fly characterization of a device during the color management can be provided.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 5 is an architecture diagram for a general purpose computer, suitable for performing color management processes in accordance with example embodiments of the invention.

DETAILED DESCRIPTION

Figure 2:
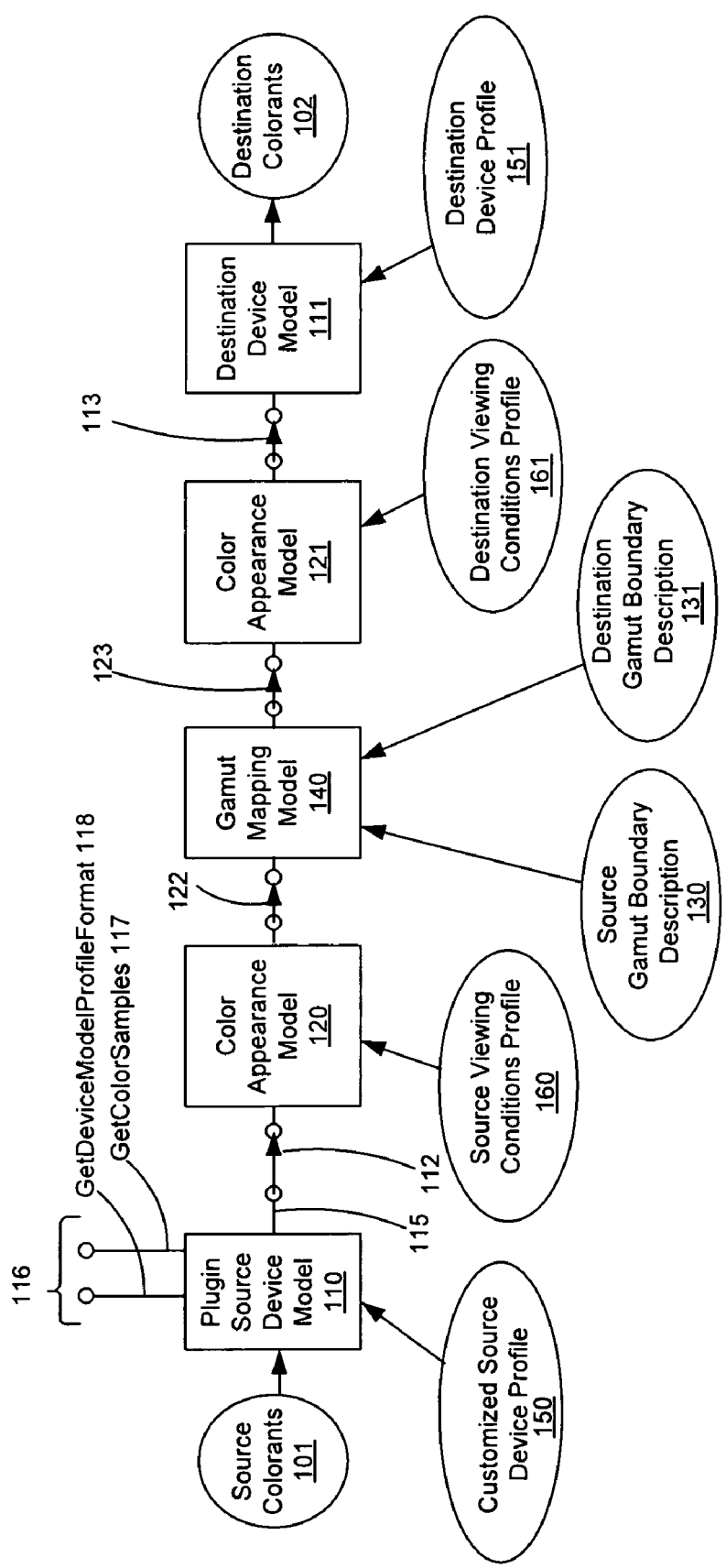
FIG. 2 depicts a plugin device model interacting with a MBCMS, according to a first example embodiment of the invention.

FIG. 2 depicts a plugin device model interacting with a Measurement-Based Color Management System (MBCMS), according to a first example embodiment of the invention. Plugin device models can be provided for source and/or destination devices. As shown in FIG. 2, plugin device model 110 is a source device model.

The MBCMS is a measurement-based CMS such as, for example, a Microsoft Windows Color System® included with a Microsoft Windows operating system, a Canon Kyuanos MBCMS, or any other MBCMS that supports plugin device models. The MBCMS can be implemented as a separate DLL, as part of a device driver such as a scanner or printer driver, as a stand-alone program, or as an integral part of the operating system itself, or the like.

The MBCMS includes software modules that interact with profiles and plugin device models to perform color management. In the example embodiment, these software modules include baseline destination device model 111, color appearance models 120 and 121, and gamut mapping model 140. In other embodiments, a separately provided plugin destination device model may be used in place of baseline destination device model 111.

Gamut mapping model 140 uses a gamut boundary description for the source device (i.e., 130) and a gamut boundary description for the destination device (i.e., 131) to convert source device color appearance values 122 to destination device color appearance values 123.

In this example embodiment, color appearance models 120 and 121 use appearance model profiles 160 and 161 (respectively) to convert between color values in the CIEXYZ color space (e.g., 112 and 113) and color values in the color appearance space (e.g., CIECAM02 Jch), such as, for example, color values 122 and 123. Destination device model 111 uses destination device profile 151 to convert colors in the CIEXYZ color space (e.g., 113) to destination device colors (colorants) 102. In other embodiments, color values 112 and 113 can be color values in any other device independent color space, such as, for example, the CIELAB color space.

Plugin device model 110, as opposed to a baseline destination device model 111, departs from a baseline model and is tailored to specific behavior of the modeled device, such as for example, a printer, a display, a scanner, a digital camera, or any other modeled device. Often, plugin model 110 is created by the device vendor, to take advantage of the behavior of the device that is understood by the vendor. When used with a customized measurement-based device profile (e.g., 150) that provides additional information about the device (beyond information typically included in a profile and expected by a baseline device model), plugin device model 110 provides the MBCMS with a more accurate model of the device's behavior.

Plugin source device model 110 includes a MBCMS interface used by the MBCMS for color conversion processing. The MBCMS uses the MBCMS interface to convert between device dependent color values (e.g., source device colorants 101) and device independent color values. This color conversion depends on device profile 150, which is accessed by plugin device model 110. Plugin source device model 110 interacts with color appearance model 120 via the methods of the MBCMS interface, such as, for example, MBCMS interface method 115.

It should be noted that although FIG. 2 (and FIGS. 3 and 4, which will be described below) depicts one MBCMS interface method, the MBCMS interface can include any number of methods which are not shown in the drawings, such as, for example, the methods described below in Table 1. The depiction of only a single MBCMS interface method in the drawings is intended only to assist in clarity of explanation.

Plugin source device model 110 also includes a color profiler interface 116. Color profiler interface 116 is used when plugin source device model 110 is interacting with a color profiler, as will be described below in the description of FIG. 3. However, in the embodiment illustrated in FIGS. 2 and 3, when plugin source device model 110 is interacting with the MBCMS, color profiler interface 116 is not used. In an example embodiment of the invention, color profiler interface 116 includes methods 117 and 118. As illustrated in FIG. 2, these methods are not used when plugin source device model 110 is interacting the MBCMS.

In the example embodiment, MBCMS and color profiler interfaces are Component Object Model (COM) interfaces, however, in other embodiments, the interfaces can be any other suitable type of interface. Table 1 defines the methods exposed by the MBCMS interface and Table 2 defines the methods exposed by the color profiler interface.

TABLE 1

| Plugin Device Model MBCMS Interface Definition | |
|---|---|
| MBCMS Interface Methods | Description |
| ColorimetricToDeviceColors([in] int nColors, [in] floatArray pColorimetricColors, [out] floatArray pDeviceColorants) | Returns the appropriate device colors in response to the specified number of colors, CIEXYZ colors and the proprietary plugin algorithms. nColors is the number of colors to process, pColorimetricColors is a pointer to an array of colorimetric color values (CIEXYZ) and pDeviceColorants is a pointer to an array to hold the device colorant combinations resulting from the conversion. |
| DeviceToColorimetricColors([in] nColors, [in] floatArray pDeviceColorants, [out] floatArray pColorimetricColors) | Returns the appropriate CIEXYZ colors in response to the specified number of colors, device colors and the proprietary plugin algorithms. nColors is the number of colors to process, pDeviceColorants is a pointer to an array of device colorant combinations, and pColorimetricColors is a pointer to an array of colorimetric color values (CIEXYZ) to hold the results of the conversion. |
| GetGamutBoundaryMesh([in] int nChannels, [in] int nVertices, [in] int nTriangles, [out] floatArray pVertices, [out] floatArray pTriangles) | Returns the triangular mesh from the plugin. This function is used to compute the GamutBoundaryDescription. nChannels is the number of channels, nVertices is the number of vertices, nTriangles is the number of triangles, pVertices is a pointer to the array of vertices in the plug-in model gamut shell, and pTriangles is a pointer to the array of triangles in the plug-in model gamut shell. |
| GetGamutBoundaryMeshSize([out] int pNumVertices, [out] int pNumTriangles) | Returns the required data structure sizes for the GetGamutBoundaryMesh function. pNumVertices is the required number of vertices, and pNumTriangles is the required number of triangles. |
| GetNeutralAxis([in] int nColors, [out] floatArray pXYZColors) | Returns the CIEXYZ colorimetry of sample points along the device's neutral axis. nColors is the number of points that are returned, and pXYZColors is a pointer to an array of gamut map model color structures that specify colors for use with the gamut map model plug-in. |
| GetNeurtralAxisSize([out] int pColors) | Returns the number of data points along the neutral axis that are returned by the GetNeutralAxis function. It is provided so that a Color Management Module (CMM) can allocate an appropriately sized buffer. pColors is the number of points that will be returned by a call to GetNeutralAxis. |
| GetNumChannels([out] int pNumChannels) | Returns the number of device channels. pNumChannels is a pointer to an unsigned integer representing the number of color channels for a device. |
| GetPrimarySamples([out] PrimaryXYZColors pPrimaryColor) | Returns the measurement color for the primary sample. pPrimaryColor is the primary color type, which is determined by using the hue circle order. If the plugin device model does not natively support primaries for red, yellow, green, cyan, blue, magenta, black and white, it must still return virtual primary data. |
| Initialize([in] bstr bstrProfile, [in] int nNumModels, [in] int nModelPosition) | Takes a pointer to a stream that contains the whole device model plugin as input, and initializes any internal parameters required by the plugin. bstrProfile is a string that contains the BSTR XML device model plug-in |

TABLE 1-continued

Plugin Device Model MBCMS Interface Definition

| MBCMS Interface Methods | Description |
|---|---|
| | profile, nNumModels is the number of total models in the transform sequence, and uModelPosition is the one-based model position of the other device model in the workflow of nNumModels as provided in the Initialize function. |
| SetTransfomDeviceModelInfo([in] int nOthermodelPosition, [in] IDeviceModelPlugIn pIDeviceModelOther) | Provides the plugin with parameters to determine where in the transform sequence the specific plugin occurs. nOthermodelPosition is the one-based model position of the other device model in the workflow of nNumModels, as provided in the initialize function, and pIDeviceModelOther is a pointer to a IDeviceModelPlugIn interface that contains the other device model in the transform sequence. |

TABLE 2

Plugin Device Model Color Profiler Interface Definition

| Color Profiler Interface Methods | Description |
|---|---|
| GetColorSamples([out] int pNumSamples, [out] floatArray pDeviceColorants, [out] floatArray pColorimetricColors) | Returns color sample information from the plugin, which is used by a color profiler to generate a device profile. pNumSamples is a pointer to an integer into which will be stored the number of samples used by a color profiler to create a color target, pDeviceColorants is a pointer to an array of <*pNumSamples> colorant combinations representing the device colorant combinations identifying the individual samples, and (optional) pColorimetricColors is a pointer to an array of <*pNumSamples> colorimetric values corresponding to the measured values of an input target. |
| GetDeviceModelProfileFormat([out] string pSchema) | Returns color profile format information from the plugin, which is used by a color profiler to generate a device profile. pSchema is a pointer to an XML schema that defines the layout of the measurement information to be used by the color profiler when creating a color profile |

In the example embodiment, the methods exposed by the MBCMS Interface listed in Table 1 are those that are required to be exposed by an IDeviceModelPlugIn Component Object Model (COM) interface of the Microsoft Windows Color System®. See "Windows Color System", Version 1.0, Microsoft Developer Network, the entire contents of which are incorporated by reference as if set forth in full herein.

The GetColorSamples method is provided by the plugin device model and is used by the color profiler to generate a color profile that includes information expected by the plugin device model. When the color profiler calls GetColorSamples, the plugin device model responds by providing the color profiler with the number of color samples (pNumSamples) and the corresponding device values (pDeviceColorants) to be measured. The color profiler interacts with a hardware device to generate a color target based on the information received by the call to GetColorSamples, and to measure the color samples of the generated color target. These measurements are included in the generated color profile. In this manner, the plugin device model communicates to the color profiler the measurement information to be included in the generated color profile.

The plugin device model performs the GetColorSamples method by setting pNumSamples and pDeviceColorants to appropriate values as determined by, for example, a device vendor, so that the generated profile includes measurement information expected by the plugin device model for modeling the hardware device's behavior. The plugin device model uses inline data (i.e., predetermined data) included in the source code for the GetColorSamples method to set the values for pNumSamples and pDeviceColorants. However, in other embodiments, the plugin device model can compute these values using an algorithm.

For example, a plugin device model for an 8-bit RGB monitor that expects measurement data for the colors black, full red, full green, full blue, and white to be included in the generated color profile sets pNumSamples=5 and sets pDeviceColorants to include RGB values black (0,0,0), full red (255,0,0), full green (0,255,0), full blue (0,0,255), and white (255,255,255), in response to a call to GetColorSamples.

An example implementation of the GetColorSamples method for the plug-in device model for the RGB monitor is shown below in Table 3.

TABLE 3

GetColorSamples Implementation

```
void GetColorSamples([out] int pNumSamples, [out] floatArray pDeviceColorants, [out] floatArray
pColorimetricColors)
{
    //
    //    Inline data is used to set the return values.
    //
    pNumSamples = 5; /* 5 samples */
    pColorimetricColors = nil; /* not set by this routine */
    pDeviceColorants = new floatArray[5][3]; /* 5 samples, 3 colorants per sample */
        pDeviceColorants[0][0] = 0; pDeviceColorants[0][1] = 0; pDeviceColorants[0][2] = 0; /* R = G = B =
0 -> black */
        pDeviceColorants[1][0] = 255; pDeviceColorants[1][1] = 0; pDeviceColorants[1][2] = 0; /* R =
255, G = B = 0 -> red */
        pDeviceColorants[2][0] = 0; pDeviceColorants[2][1] = 255; pDeviceColorants[2][2] = 0; /* R = 0,
G = 255, B = 0 -> green */
        pDeviceColorants[3][0] = 0; pDeviceColorants[3][1] = 0; pDeviceColorants[3][2] = 255; /* R =
```

TABLE 3-continued

GetColorSamples Implementation

```
G = 0, B = 255 -> blue */
    pDeviceColorants[4][0] = 255; pDeviceColorants[4][1] = 255; pDeviceColorants[4][2] = 255; /*
R = G = B = 255 -> white */
}
```

As shown in Table 3, GetColorSamples uses inline data (i.e., predetermined data) included in the source code for the GetColorSamples method to set the return values (i.e., the values for pDeviceColorants). However, in other embodiments, GetColorSamples can compute the return values using an algorithm.

The GetDeviceModelProfileFormat method is provided by the plugin device model. The color profiler calls this method before storing the generated profile on a storage medium. When the color profiler calls the GetDeviceModelProfileFormat method, the plugin device model responds by providing the color profiler with the specific color profiler format (pSchema) expected by the plugin device model. The color profiler stores the obtained measurement information on the storage medium in the format received by the plugin device model.

The specific implementation of GetDeviceModelProfileFormat is dependent on the details of the implementation of the MBCMS. In the example embodiment, the plugin device model performs the GetDeviceModelProfileFormat method by retrieving the profile format from a file stored on a file system. The plugin device model opens the file containing the profile format, and reads the profile format from the file into a memory location specified by pSchema. However, in other embodiments, the profile format can be specified by inline data included in the source code for the GetDeviceModelProfileFormat method.

An example implementation of the GetDeviceModelProfileFormat method is shown below in Table 4.

TABLE 4

GetDeviceModelProfileFormat Implementation

```
void GetDeviceModelProfileFormat([out] string pSchema)
{
    //
    //    The data is retrieved from a file on the system.
    //
    String          schemaString;
    StreamFile      schemaFile;
    schemaFile.Open("MySchemaFile", ReadOnly);
    schemaFile.Read(schemaString);
    pSchema = schemaString;
}
```

As shown in Table 4, GetDeviceModelProfileFormat retrieves the profile format from a file stored on a file system.

The MBCMS (including models 111, 120, 121 and 140) and plugin source device model 110 are implemented as program instructions residing on a general purpose computer running a Microsoft Windows operating system. In other embodiments, the MBCMS and plugin source device model 110 can reside on separate computers running any operating system.

Figure 1:
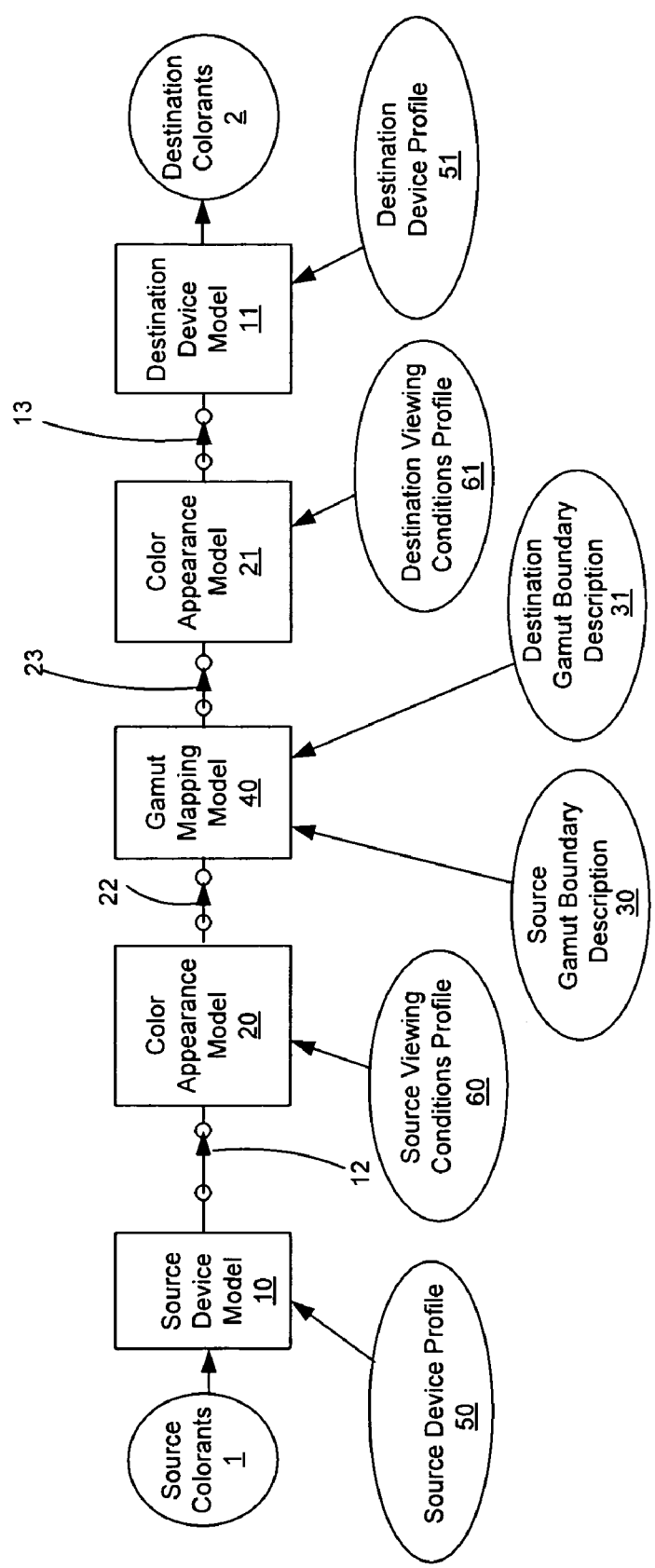
FIG. 1 depicts a workflow of a measurement-based CMS.

The workflow of the MBCMS illustrated in FIG. 2 is similar to the MBCMS workflow described above with respect to FIG. 1. More specifically, the processes for generating appearance values 122 and 123, and destination device colors (colorants) 102 is similar to the processes for generating appearance values 22 and 23, and destination device colors (colorants) 2 as described above for FIG. 1

Figure 3:
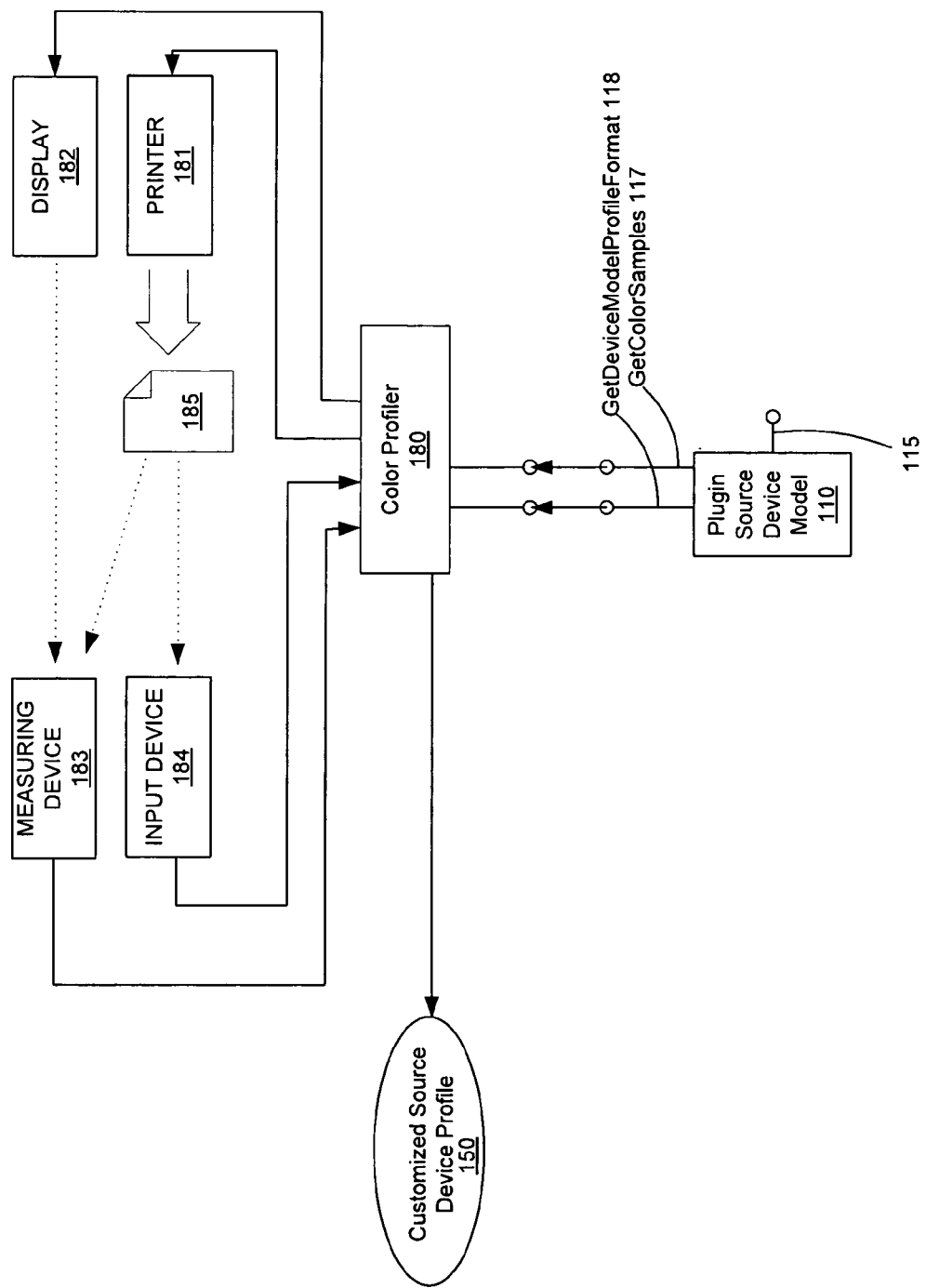
FIG. 3 depicts a plugin device model interacting with a color profiler, according to the first example embodiment of the invention.

FIG. 3 depicts the same plugin source device model 110 as that of FIG. 2, but instead of interacting with a MBCMS as in FIG. 2, the plugin source device model is interacting with color profiler 180. Color profiler 180 (which is sometimes referred to as a "device profile constructor") generates customized source device profile 150. In the example embodiment, color profiler 180 is a separate general-purpose computer executing a color profiler program. However, in other embodiments, color profiler 180 can be implemented as program instructions residing on the same computer as the MBCMS and/or plugin source device model 110.

Color profiler 180 interacts with plugin source device model 110, via color profiler interface 116, to more easily produce customized measurement-based device profile 150. As illustrated, when device model 110 is interacting with color profiler 180, MBCMS interface method 115 is not used.

Color profiler 180 is interfaced to target devices 181, 182 and 184 as well as color measurement device 183 (e.g., a calorimeter). Target devices 181, 182 and 184 are a printer, a display, and a digital input device (respectively). Digital input device 184 is, for example, a scanner, a digital camera, or any other type of digital input device.

In operation, to generate color device profile 150, color profiler 180 calls the GetColorSamples method 117 of color profiler interface 116 to receive color sample information from plugin device model 110. Color profiler 180 uses the received color sample information to generate color target 185 for the modeled device (e.g., 181, 182, or 184). The color sample information specifies the number of color samples to be included in the generated color target and the corresponding color values (in the color space of the modeled device) for each color sample.

To generate a device profile for printer 181, color profiler 180 controls printer 181 to print the device color values returned by GetColorSamples method 117, thereby generating printed target 185. Next, color profiler 180 uses measuring device 183 to measure color values of color target 185's color samples. Color profiler 180 uses these measured color values and the corresponding color values returned by GetColorSamples method 117 to generate customized device profile 150.

To generate a device profile for display 182, color profiler 180 displays the device color values returned by the GetColorSamples method 117 on display 182, thereby generating a color target on display 182. Next, color profiler 180 uses measuring device 183 to measure color values of the color target displayed on display 182. Color profiler 180 uses these measured color values and the corresponding color values returned by GetColorSamples method 117 to generate customized device profile 150.

To generate a device profile for digital input device 184, color profiler 180 controls printer 181 to print the device color values returned by GetColorSamples method 117, thereby generating printed target 185. Then, color profiler 180 uses measuring device 183 to measure color values of color target 185's color samples. Next, digital input device 184 captures an image of color target 185, and color profiler 180 receives the captured image from digital input device 184. Color profiler 180 uses the color values measured by measuring device 183 and the corresponding color values of each color sample of the captured image to generate customized device profile 150.

After device profile 150 is generated, color profiler 180 stores device profile 150 on a computer-readable storage medium in a profile format specified by plugin device model 110. Color profiler 180 receives the profile format from plugin device model 110 by calling GetDeviceModelProfileFormat method 118 of color profiler interface 116. The profile format can be any suitable type of profile format, such as, for example a format specified by an Extensible Markup Language (XML) schema.

Figure 4:
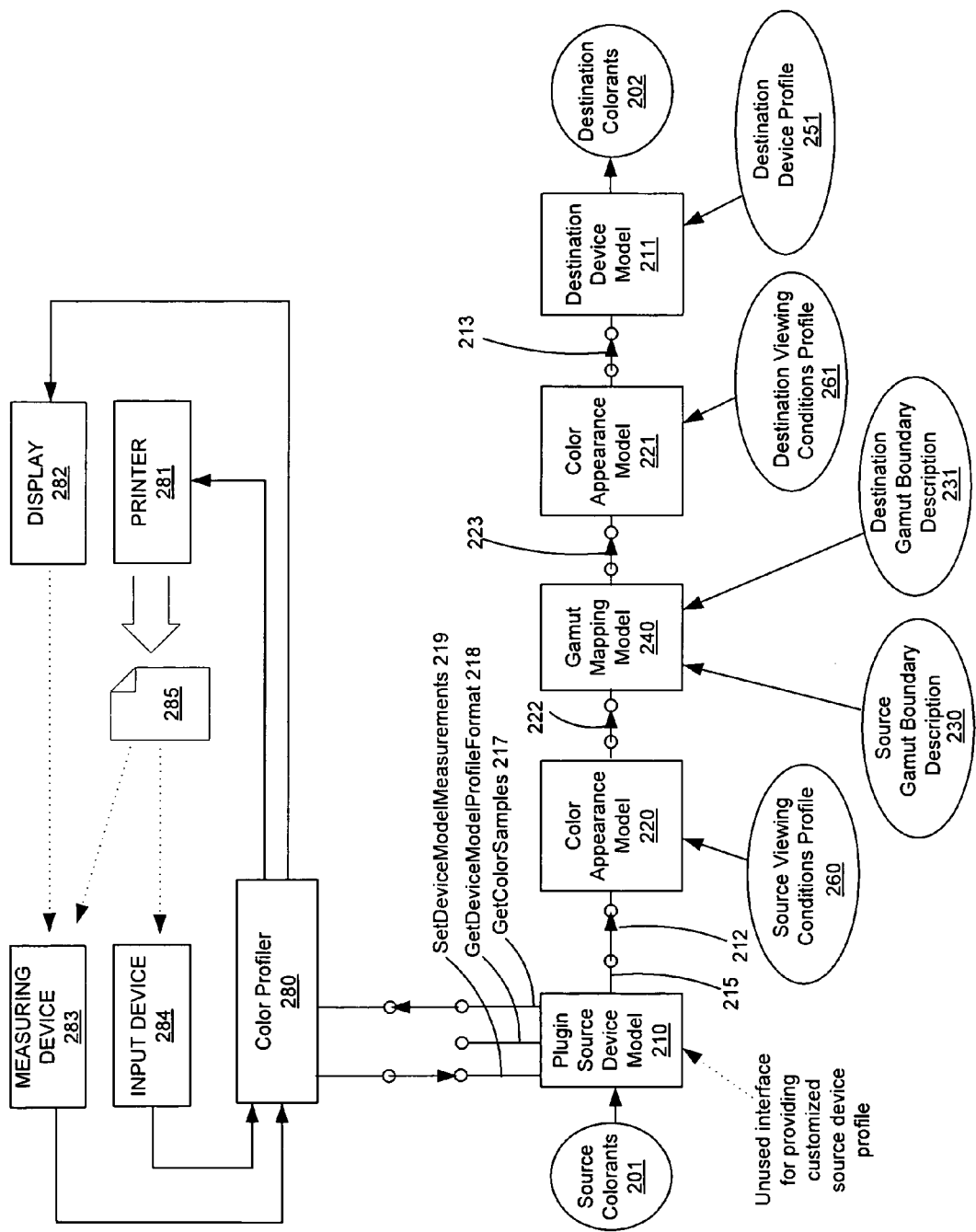
FIG. 4 depicts a plugin device model interacting with both a MBCMS and a color profiler, according to a second example embodiment of the invention.

FIG. 4 depicts a second example embodiment of the invention in which the plugin device model interacts with both a MBCMS and a color profiler to provide on-the-fly characterization of a device during the color management process.

Gamut mapping model 240 uses a gamut boundary description for the source device (i.e., 230) and a gamut boundary description for the destination device (i.e., 231) to convert source device color appearance values 222 to destination device color appearance values 223.

Color appearance models 220 and 221 use appearance model profiles 260 and 261 (respectively) to convert between color values in the CIEXYZ color space (e.g., 212 and 213) and color values in the color appearance space (e.g., CIECAM02 Jch), such as, for example, color values 222 and 223. Destination device model 211 uses destination device profile 251 to convert colors in the CIEXYZ color space (e.g., 213) to destination device colors (colorants) 202. In other embodiments, color values 212 and 213 can be color values in any other device independent color space, such as, for example, the CIELAB color space.

The workflow of the MBCMS illustrated in FIG. 4 is similar to the MBCMS workflow described above with respect to FIG. 1. More specifically, the processes for generating appearance values 222 and 223, and destination device colors 202 is similar to the processes for generating appearance values 22 and 23, and destination device colors 2 as described above for FIG. 1.

In this second embodiment, when plugin source device model 210 is interacting with the MBCMS, the color profiler interface is used by color profiler 280 to generate the customized source device profile on-the-fly. The color profiler interface includes method 219 (SetDeviceModelMeasurements) for sending measurements included in the customized source device profile directly to plugin source device model 210.

The SetDeviceModelMeasurements method is provided by the plugin device model and used by the color profiler for use in the case where the plugin device model has direct communication with the color profiler so that there is no need to produce a device model profile. In this case, the color profiler sends the obtained measurements directly to the plugin device model by calling the SetDeviceModelMeasurements method. During the initialization of the device model, the device model is aware of the fact that the direct communication to the profiler is in place. Then, after performing the receiving and responding to the call to the GetColorSamples method from the color profiler, the plugin device model will expect a call to the SetDeviceModelMeasurements method from the color profiler, at which point, it will receive the measurements corresponding to the color samples provided in the GetColorSamples call and can proceed with the computation of the device model correlation.

An example implementation of the SetDeviceModelMeasurements method is shown below in Table 5.

TABLE 5

SetDeviceModelMeasurements Implementation

```
//
//      (Returns error code or 0 if no error)
//
struct SampleDataPoint
{
        float           Red, Green, Blue;       // Device colorant value
        float           X, Y, Z;                // Corresponding measurement
};
SampleDataPoint         dataPoints[5];
int SetDeviceModelMeasurements ([in] int pNumSamples, [in] floatArray pDeviceColorants, [in]
floatArray pColorimetricColors)
{
        //
        //      Receive device model measurements directly from the color profiler process
        //
        const int       properNumberOfSamples = 5;
        if (pNumSamples != properNumberOfSamples ||
            pDeviceColorants->NumberOfRows( ) != properNumberOfSamples) // NumberOfRows is an
intrinsic of floatArray and returns the number of rows (1$^{st}$ dimension)
                return –1;
        if (pDeviceColorants->NumberOfColumns( ) != 3) // NumberOfColumns is an intrinsic of
floatArray and returns the number of columns (2$^{nd}$ dimension)
                return –2;
        for (int i = 0; i < properNumberOfSamples; ++i)
        {
                dataPoints[i].Red = pDeviceColorants[i][0];
                dataPoints[i].Green = pDeviceColorants[i][1];
                dataPoints[i].Blue = pDeviceColorants[i][2];
                dataPoints[i].X = pColorimetricColors[i][0];
                dataPoints[i].Y = pColorimetricColors[i][1];
                dataPoints[i].Z = pColorimetricColors[i][2];
        }
        return ComputeDeviceModelFromData(properNumberOfSamples, dataPoints);
}
```

As shown in Table 5, the color profiler sends the obtained measurements directly to the plugin device model by calling the SetDeviceModelMeasurements method and setting the parameter pNumSamples to the value received from the call to GetColor Samples, setting the parameter pDeviceColorants to the values received from the call to GetColorSamples, and setting the parameter pColorimetricColors to the measured values obtained by the color profiler.

The ComputeDeviceModelFromData function shown in Table 5 is internal to the device model. The ComputeDeviceModelFromData function performs a correlation between device colorant values and corresponding measurements to produce a matrix that can be used to adequately predict what would be measured for any given device colorant combination. In other embodiments, instead of producing a matrix, the ComputeDeviceModelFromData function can produce a look-up table, or some other type of mathematic model that can adequately predict what would be measured for any given device colorant combination.

In the example embodiment, ComputeDeviceModelFromData populates a simple matrix that is used during the DeviceToColorimetricColors operation such that the source device colorants presented to DeviceToColorimetricColors are assembled into a vector of three elements (red, green, and blue) which is multiplied by the matrix to produce a corresponding vector of three elements (X, Y, Z).

Color profiler 280 is interfaced to target devices 281, 282 and 284 as well as color measurement device 283 (e.g., a calorimeter). Target devices 281, 282 and 284 are a printer, a display, and a digital input device (respectively). Digital input device 284 is, for example, a scanner, a digital camera, or any other type of digital input device.

Color profiler 280 generates the color profile and color target 285 in a manner similar to the color profile and color target generation processes described above for FIG. 3. However, instead of storing the generated device profile on a computer readable storage medium, color profiler 280 sends the measurements included in the generated measurement-based profile directly to plugin device model 210 using SetDeviceModelMeasurements method 219. Because plugin device model 210 receives the measurements directly from color profiler 280, GetDeviceModelProfileFormat method 218 and the interface for providing a customized device profile and are not used.

After receiving the measurements included in the generated measurement-based profile, plugin device model 210 uses these measurements to convert source device colors (colorants) 201 into color values in, for example, the CIEXYZ color space. Device model 210 then sends color values 212 to color appearance model 220 via MBCMS interface method 215.

It should be noted that although FIGS. 2, 3 and 4 depict a source device model plugin, a separately provided plugin destination device model may be used in place of the depicted baseline destination device model (e.g., 111 or 211), and the process for interacting with the color profiler via the color profiler interface would be the same as described above for the source device model plugin. The depiction of only a source device plugin model with a color profiler interface in the drawings is intended only to assist in clarity of explanation.

FIG. 5 is an architecture diagram for a general purpose computer, suitable for performing the processes described above for FIGS. 2, 3 and 4. The general purpose computer 1000 includes a processor 1001 coupled to a memory 1002 via system bus 1004. The processor is also coupled to external Input/Output (I/O) devices via the system bus and an I/O bus 1005. A storage device having computer-readable media 1006 is coupled to the processor via a storage device controller 1008 and the I/O bus and the system bus. The storage device is used by the processor to store and read data 1010 and program instructions 1012 used to implement the color management processes of the MBCMS, source device models 110 and 210, and color profilers 180 and 280 as described above.

Program instructions 1012 include, for example, MBCMS program instructions and program instructions for plug-in device models 110 and 210, and color profilers 180 and 280. Data 1010 includes, for example, device profiles and other profiles used by the MBCMS and/or plugin device models 110 and 210.

The processor may be further coupled to a user output device 1018 via a user output device controller 1020 coupled to the I/O bus. The processor may be further coupled to a user input device 1009 via a user input device controller 1016 coupled to the I/O bus. The processor uses the user input device to allow a user to install and/or select profiles and plug-in models as described above.

The processor may be further coupled to a communications device 1022 via a communications device controller 1024 coupled to the I/O bus. The processor may use the communications device to communicate with another device for transferring a profile, plug-in model, and/or an image. Examples of devices that may be coupled to communications device 1022 include printers, scanners, digital cameras, and digital video cameras. The processor may also use the communications device to receive program instructions and data from the Internet, or any other type of network.

In operation, the processor loads the program instructions from the storage device into the memory. The processor executes the loaded program instructions to implement the color management processes as described above.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A computer-readable storage medium that retrievably stores a plugin device model for use within a measurement-based color management system (MBCMS), the plugin device model comprising:
 a MBCMS interface used by the MBCMS for color conversion processing, wherein the MBCMS uses the MBCMS interface to convert between device dependent color values and device independent color values, and wherein conversion depends on a device profile accessed by the plugin device model; and
 a color profiler interface used by a color profiler for generation of a measurement-based color device profile to be accessed by the plugin device model, wherein the color profiler uses the color profiler interface to generate a device color profile containing information expected by the plugin device model for color conversion processing in the MBCMS,
 wherein the color profiler interface includes a method for getting color sample information from the plugin device model.

2. The storage medium of claim 1, wherein the color profiler uses the color sample information to generate a color target, and wherein the color sample information specifies a number of color samples to be included in the color target, and corresponding device color values for each color sample.

3. The storage medium of claim 1, wherein the color profiler interface includes a method for getting color profile format information from the plugin device model, and wherein the color device profile generated by the color profiler is generated according to the received color profile format information.

4. The storage medium of claim 3, wherein the color profile format information includes an XML schema.

5. The storage medium of claim 1, wherein the color profiler interface includes a method for sending measurements included in the generated color profile to the plugin device model.

6. A method for using a plugin device model within a measurement-based color management system (MBCMS), the method comprising:
using at least one processor to access a MBCMS interface of the plugin device model to convert between device dependent color values and device independent color values,
wherein the plugin device model includes a color profiler interface used by a color profiler for generation of a color device profile to be accessed by the plugin device model,
wherein the color profiler uses the color profiler interface to generate a color device profile containing information expected by the plugin device model for color conversion processing in the MBCMS,
wherein the color profiler interface includes a method for getting color sample information from the plugin device model.

7. A color profiling method for generating a measurement-based color device profile for a device, the color profile being generated for use with a plugin device model in a measurement-based color management system (MBCMS), the method comprising:
a color sample information receiving step of a color profiler receiving color sample information from the plugin device model, using at least one processor which executes a programming interface provided by the plugin device model;
a color target generating step of the color profiler generating a color target having color samples as specified by the received color sample information;
a measuring step of measuring the color values of the color target's color samples; and
a profile generating step of generating the color device profile, based on the color values measured in the measuring step.

8. The method of claim 7, wherein the color sample information specifies a number of color samples to be included in the generated color target, and corresponding device color values for each color sample.

9. The method of claim 8, wherein the device is a printer, the color target is a printed target generated by printing the specified device color values using the printer in the color target generating step, and the specified device color values are used to generate the color device profile in the profile generating step.

10. The method of claim 8, wherein the device is a display, the color target is a displayed target generated by displaying the specified device color values on the display in the color target generating step, and the specified device color values are used to generate the color device profile in the profile generating step.

11. The method of claim 8, wherein the device is a digital input device, and the color target is a printed target generated by using a printer to print the specified device color values in the color target generating step, and wherein the digital input device is used to capture an image of the color target, and device color values of the captured image can be used to generate the color device profile in the profile generating step.

12. The method of claim 11, wherein the digital input device includes at least one of a digital camera and a scanner.

13. The method of claim 7, further comprising a profile format information receiving step of the color profiler receiving color profile format information from the plugin device model, using the programming interface provided by the plugin device model, and wherein the color device profile generated in the profile generating step is generated according to the received color profile format information.

14. The method of claim 13, wherein the color profile format information includes an XML schema.

15. The method of claim 7, wherein the generated color device profile is stored on a computer-readable storage medium.

16. The method of claim 7, wherein measurements included in the generated color device profile are sent to the plugin device model using the programming interface provided by the plugin device model.

17. The method of claim 7, wherein the color management system is a Microsoft Windows Color System®.

18. A computer-executable color profiler program retrievably stored on a computer-readable storage medium, the color profiler program being executable by a computer so as to control the computer to perform a method for generating a measurement-based color device profile for a device, the color device profile being generated for use with a plugin device model in a measurement-based color management system (MBCMS), the method comprising:
a color sample information receiving step of a color profiler receiving color sample information from the plugin device model, using a programming interface provided by the plugin device model;
a color target generating step of the color profiler generating a color target having color samples as specified by the received color sample information;
a measuring step of measuring the color values of the color target's color samples; and
a profile generating step of generating the color device profile, based on the color values measured in the measuring step.

* * * * *